United States Patent
Iijima et al.

(10) Patent No.: US 8,978,814 B2
(45) Date of Patent: Mar. 17, 2015

(54) VEHICLE STEERING DEVICE

(75) Inventors: Takeshi Iijima, Saitama (JP); Yoshifumi Banno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/114,005

(22) PCT Filed: Apr. 20, 2012

(86) PCT No.: PCT/JP2012/060770
§ 371 (c)(1),
(2), (4) Date: Oct. 25, 2013

(87) PCT Pub. No.: WO2012/147661
PCT Pub. Date: Nov. 1, 2012

(65) Prior Publication Data
US 2014/0041958 A1 Feb. 13, 2014

(30) Foreign Application Priority Data
Apr. 27, 2011 (JP) ................. 2011-100065

(51) Int. Cl.
*B62D 5/04* (2006.01)
*B62D 6/04* (2006.01)
*B62D 6/00* (2006.01)

(52) U.S. Cl.
CPC ............... *B62D 5/0463* (2013.01); *B62D 6/04* (2013.01); *B62D 6/008* (2013.01)
USPC ....................................... 180/446

(58) Field of Classification Search
CPC .... B62D 5/0463; B62D 5/046; B62D 5/0457; B62D 6/04; B62D 6/008
USPC ............... 180/443, 446; 701/41, 42
See application file for complete search history.

(56) References Cited

U.S. PATENT DOCUMENTS 6,778,890 B2 * 8/2004 Shimakage et al. ............. 701/41
7,860,624 B2 * 12/2010 Kubota et al. .................. 701/41
(Continued)

FOREIGN PATENT DOCUMENTS

JP 3103049 B2 10/2000
JP 2009-143484 A 7/2009
(Continued)

OTHER PUBLICATIONS

International Search Report, PCT/JP2012/060770 dated Jul. 10, 2012.
(Continued)

*Primary Examiner* — Kevin Hurley
(74) *Attorney, Agent, or Firm* — Carrier Blackman & Associates, P.C.; Joseph P. Carrier; William D. Blackman

(57) ABSTRACT

The present invention provides a vehicle steering device, comprising: a manual steering means for manually steering steerable wheels in a vehicle; a steering-torque detection means for detecting a steering torque applied to the manual steering means; a first electromotive-torque determination means for determining a first electromotive-torque value based on the detected steering torque; a vehicle-behavior detection means for detecting behavior of the vehicle; a second electromotive-torque determination means for determining a second electromotive-torque value based on a detected value obtained by the vehicle-behavior detection means; an electric motor for applying a combined electromotive torque to the steerable wheels; and a current control means for controlling current supplied to the electric motor based on a value of the combined electromotive torque obtained by adding the first electromotive-torque value to the second electromotive-torque value.

5 Claims, 10 Drawing Sheets

(56) References Cited

U.S. PATENT DOCUMENTS 8,494,717 B2 7/2013 Barton et al.
2006/0069481 A1* 3/2006 Kubota et al. ................. 701/41

FOREIGN PATENT DOCUMENTS

| JP | 101616836 A | 12/2009 |
| JP | 2010-36720 A | 2/2010 |
| JP | 2010-137621 A | 6/2010 |

OTHER PUBLICATIONS

Chinese Office Action dated Sep. 19, 2014, issued in the counterpart CN Patent Application 201280019897.1.

* cited by examiner

VEHICLE STEERING DEVICE

CROSS-REFERENCE TO RELATED APPLICATIONS

This application is a National Stage entry of International Application No. PCT/JP2012/060770, filed Apr. 20, 2012, which claims priority to Japanese Patent Application No. 2011-100065, filed Apr. 27, 2011. The disclosures of the prior applications are hereby incorporated in their entirety by reference.

TECHNICAL FIELD

The present invention relates to a vehicle steering device which generates steering-assist torque for reducing the driver's steering force and steering reaction torque for restraining the vehicle behavior.

BACKGROUND ART

The vehicle steering device is configured to use an electric motor and assist the driver with the electromotive torque of the electric motor in order to reduce the driver's steering force. The electromotive torque is increased or decreased according to the speed of the vehicle.

When the vehicle receives a strong crosswind while the vehicle is travelling, or when the vehicle travels on a rutted road, vehicle behavior such as deflection into directions away from a target travel line can occur. Therefore, the vehicle steering device detects the vehicle behavior based on the yaw rate, the lateral acceleration, and the like, and generates steering reaction torque (for restraining the vehicle behavior) based on the detected value(s). In order to address problems such as failure in each sensor arranged for detecting the yaw rate, the lateral acceleration, and the like, an upper-limit value of the steering reaction torque is determined, and a provision is made for preventing occurrence of a steering reaction torque which exceeds the upper-limit value (see Patent Literature 1, etc.).

PRIOR ART REFERENCE

Patent Literature

Patent Literature 1: JP 3103049 B

SUMMARY OF THE INVENTION

Problem to be Solved by the Invention

In the conventional vehicle steering device, the aforementioned upper-limit value is constant. Therefore, when the upper-limit value is set large, a strong steering reaction torque can be generated, and the controllability in the operation of restraining the vehicle behavior can be enhanced. However, it is considered that the driver will feel an uncomfortable feeling when a strong steering reaction torque reaching the large upper-limit value is generated by failure in a sensor. On the other hand, when the upper-limit value is set small, even if a sensor fails, the generated steering reaction torque is small because of the small upper-limit value. Therefore, the small steering reaction torque restricts the controllability in the operation of restraining the vehicle behavior although the small steering reaction torque will not cause the driver to feel an uncomfortable feeling. That is, there is a trade-off relationship between the avoidance of the driver's uncomfortable feeling and the controllability in the operation of restraining the vehicle behavior, where the large upper-limit value causes the driver's uncomfortable feeling and the small upper-limit value restricts the controllability in the operation of restraining the vehicle behavior. Thus, it is desirable to set the upper-limit value so as to moderate the driver's uncomfortable feeling and realize high controllability in the operation of restraining the vehicle behavior.

In view of the above, an object of the present invention is to provide a vehicle steering device which can moderate the driver's uncomfortable feeling and restrain the vehicle behavior with high controllability.

Means foe Solving the Problem

In order to achieve the above object, a vehicle steering device according to the present invention includes: a manual steering means for manually steering steerable wheels in a vehicle; a steering-torque detection means for detecting a steering torque applied to the manual steering means; a first electromotive-torque determination means for determining a first electromotive-torque value based on the detected steering torque; a vehicle-behavior detection means for detecting the behavior of the vehicle; a second electromotive-torque determination means for determining a second electromotive-torque value based on a detected value obtained by the vehicle-behavior detection means; an electric motor for applying a combined electromotive torque to the steerable wheels; and a current control means for controlling current supplied to the electric motor based on a value of the combined electromotive torque obtained by adding the first electromotive-torque value to the second electromotive-torque value, in which the second electromotive-torque determination means resets the second electromotive-torque value to a value equal to or less than an upper-limit value when the second electromotive-torque value is greater than the upper-limit value, and changes the upper-limit value based on the combination of the direction indicated by the second electromotive-torque value and the steering direction of the manual steering means.

According to the present invention, the upper-limit value can be changed according to the combination of the direction indicated by the second electromotive-torque value and the steering direction of the manual steering means. Therefore, it is possible to set the upper-limit value to a large value when the combination corresponds to a situation in which a large second electromotive torque is required to be generated by the electric motor, and to a small value when the combination corresponds to a situation in which it is sufficient for the electric motor to generate a small second electromotive torque. In other words, when the combination corresponds to a situation in which a large upper-limit value is set, a large electromotive torque can be generated and the controllability in the operation of restraining the vehicle behavior can be enhanced. On the other hand, when the combination corresponds to a situation in which a small upper-limit value is set, even if a sensor fails, a small electromotive torque limited by the small upper-limit value is generated so that the driver does not feel an uncomfortable feeling.

In addition, it is preferable that the upper-limit value which is set when the direction indicated by the second electromotive-torque value is identical to the steering direction of the manual steering means be less than the upper-limit value which is set when the direction indicated by the second electromotive-torque value is different from the steering direction of the manual steering means.

According to the above, when the direction indicated by the second electromotive-torque value is opposite to the steering direction of the manual steering means, the second electromotive-torque value acts on the steering operation of the manual steering means in a direction suppressing the steering operation of the manual steering means. Therefore, when a large second electromotive-torque value is set based on a large upper-limit value, the steering operation of the manual steering means can surely be suppressed. On the other hand, when the direction indicated by the second electromotive-torque value is identical to the steering direction of the manual steering means, a small second electromotive-torque value is set based on the small upper-limit value, so that it is possible to prevent excessive assist.

Further, even if a failure occurs in the vehicle-behavior detection means (e.g., a yaw-rate sensor, a lateral-acceleration sensor, or the like) while the direction indicated by the second electromotive-torque value is opposite to the steering direction of the manual steering means, the direction indicated by the large second electromotive-torque value is directed to a direction stabilizing the steering. Therefore, even if the second electromotive-torque value is set to the upper-limit value, it is possible to control the steering so as to suppress the steering operation of the manual steering means, prevent excessive steering assist, and avoid causing the driver to feel an uncomfortable feeling. Furthermore, when a failure occurs in the vehicle-behavior detection means while the direction indicated by the second electromotive-torque value is identical to the steering direction of the manual steering means, it is also possible to prevent excessive steering assist, and avoid causing the driver to feel an uncomfortable feeling, since the second electromotive-torque value is limited by the small upper-limit value.

Further, it is preferable that the second electromotive-torque determination means changes the upper-limit value based on the steering speed (steering angular velocity) of the manual steering means.

According to the above, generation of more appropriate steering reaction torque can be controlled by finely setting the upper-limit value according to the steering angular velocity.

Specifically, according to the present invention, it is preferable that the upper-limit value, which is set when the direction indicated by the second electromotive-torque value is identical to the steering direction of the manual steering means, is increased when the steering speed (the steering angular velocity) is decreased.

According to the above, when the steering direction (of the steering angular velocity) is changed between the right and left (between positive and negative), it is possible to set intermediate values between a larger upper-limit value and a smaller upper-limit value, and smoothly change the upper-limit value between the larger upper-limit value and the smaller upper-limit value. In addition, it is possible to avoid causing the driver to feel an uncomfortable feeling.

Specifically, according to the present invention, it is preferable that the upper-limit value, which is set when the direction indicated by the second electromotive-torque value is different from the steering direction of the manual steering means, is decreased when the steering speed (the steering angular velocity) is decreased.

According to the above, when the steering direction (in the steering angular velocity) is changed between the right and left (between positive and negative), it is possible to set intermediate values between a larger upper-limit value and a smaller upper-limit value, and smoothly change the upper-limit value between the larger upper-limit value and the smaller upper-limit value. In addition, it is possible to avoid causing the driver to feel an uncomfortable feeling.

Effect of the Invention

According to the present invention, it is possible to provide a vehicle steering device by which the uncomfortable feeling felt by the driver can be moderated and the operation for restraining the vehicle behavior can be highly controlled.

EMBODIMENT FOR CARRYING OUT THE INVENTION

Figure 1:
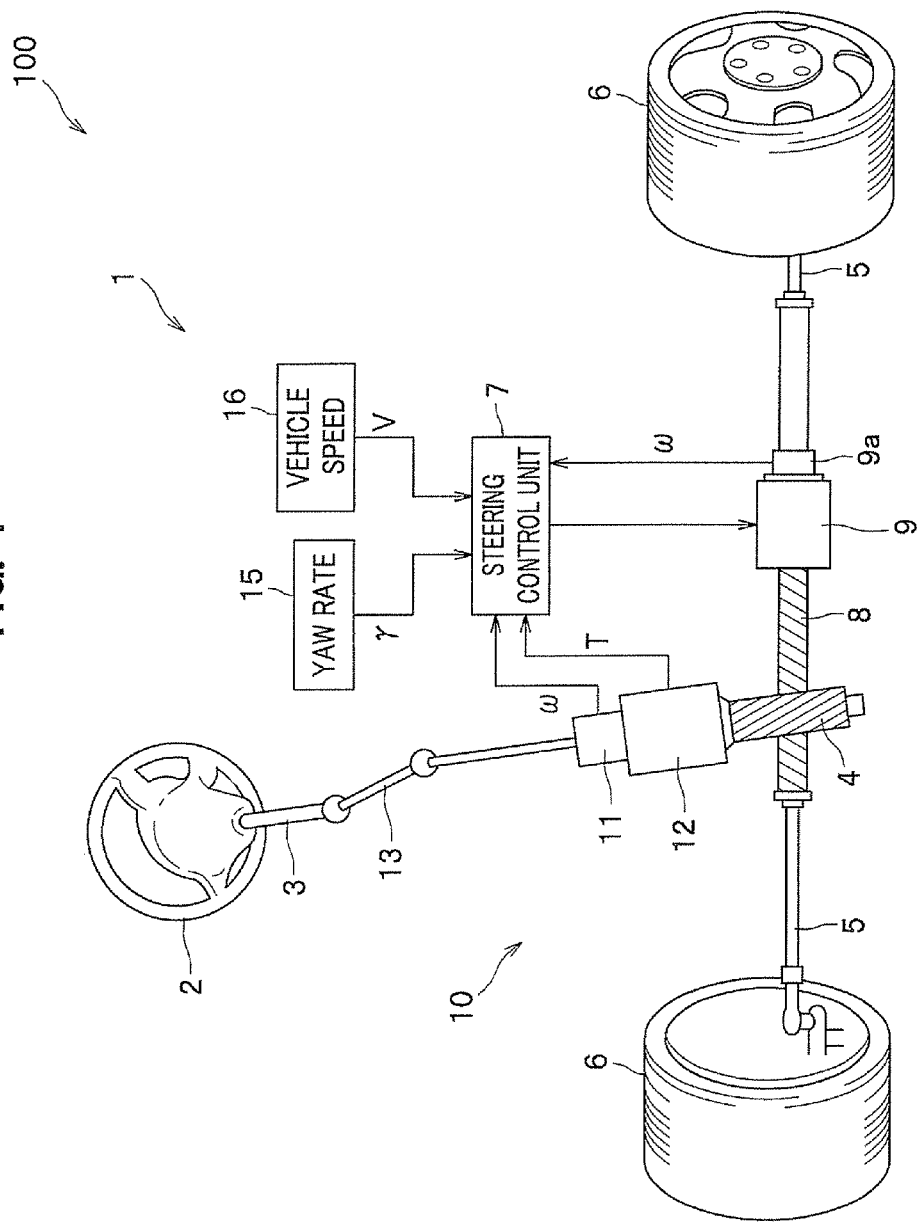
FIG. 1 is a diagram showing a configuration of a vehicle steering device (in a vehicle) according to an embodiment of the present invention.

Next, an embodiment of the present invention will be explained with reference to drawings if necessary. In the drawings, identical or equivalent components or constituents are indicated by the same reference numbers, and identical explanations are omitted.

FIG. 1 is a diagram showing a configuration of a vehicle steering device 1 according to an embodiment of the present invention (and a vehicle 100 in which the vehicle steering device 1 is mounted). A steering shaft 3 is integrally coupled to a steering wheel 2. A pinion 4 is connected to the steering shaft 3 through a connecting shaft 13 having a universal joint. A rack shaft 8 is engaged with the pinion 4, and can move back and forth in the vehicle width direction (in the axis direction of the rack shaft 8) in accordance with rotation of the pinion 4. A rack-and-pinion mechanism is formed with the pinion 4, the rack shaft 8, and other components. Tie rods 5 are integrally coupled to both ends of the rack shaft 8. Knuckle arms for right and left front wheels 6 are connected to the tie rods 5. The right and left front wheels 6 are steerable wheels. According to the above, a manual steering means 10, which steers (rotates) the front wheels (steerable wheels) 6 when the driver manipulates (rotates) the steering wheel 2, is made.

In addition, the vehicle steering device 1 is made as an electric power steering system. In order to reduce the driver's steering force, the vehicle steering device 1 uses an electric motor 9, which assists the driver for the steering with the electromotive torque of the electric motor 9. For example, the electric motor 9 is coaxially arranged at an intermediate portion of the rack shaft 8 as shown in FIG. 1, and can move back and forth in the vehicle width direction in accordance with rotation of the electric motor 9.

Further, a steering-angular-velocity sensor 11 and a torque sensor (steering torque detection means) 12 are arranged near the pinion 4 in the vehicle steering device 1. The steering-angular-velocity sensor 11 is provided for detecting the steering angular velocity $\omega$ based on the rotation angle of the steering wheel 2, and the torque sensor 12 is provided for detecting the steering torque T being applied to the steering wheel 2 and acting on the pinion 4. In addition, the steering angular velocity $\omega$ can also be detected by a resolver (steering-angular-velocity sensor) 9a, which is directly coupled to the electric motor 9.

Furthermore, a yaw-rate sensor (vehicle-behavior detection means) 15 and a vehicle-speed sensor (vehicle-behavior detection means) 16 are also arranged in the vehicle steering device 1. The yaw-rate sensor 15 is provided for detecting the yaw rate (yawing angular velocity) $\gamma$ as an aspect of the vehicle behavior, and the vehicle-speed sensor 16 is provided for detecting the traveling speed (vehicle speed) V of the vehicle 100 as another aspect of the vehicle behavior.

A steering control unit 7 acquires the steering angular velocity $\omega$, the steering torque T, the yaw rate $\gamma$, and the vehicle speed V. The steering control unit 7 controls the output of the electric motor 9 (i.e., total electromotive torque) based on the steering angular velocity $\omega$, the steering torque T, the yaw rate $\gamma$, and the vehicle speed V.

Figure 2:
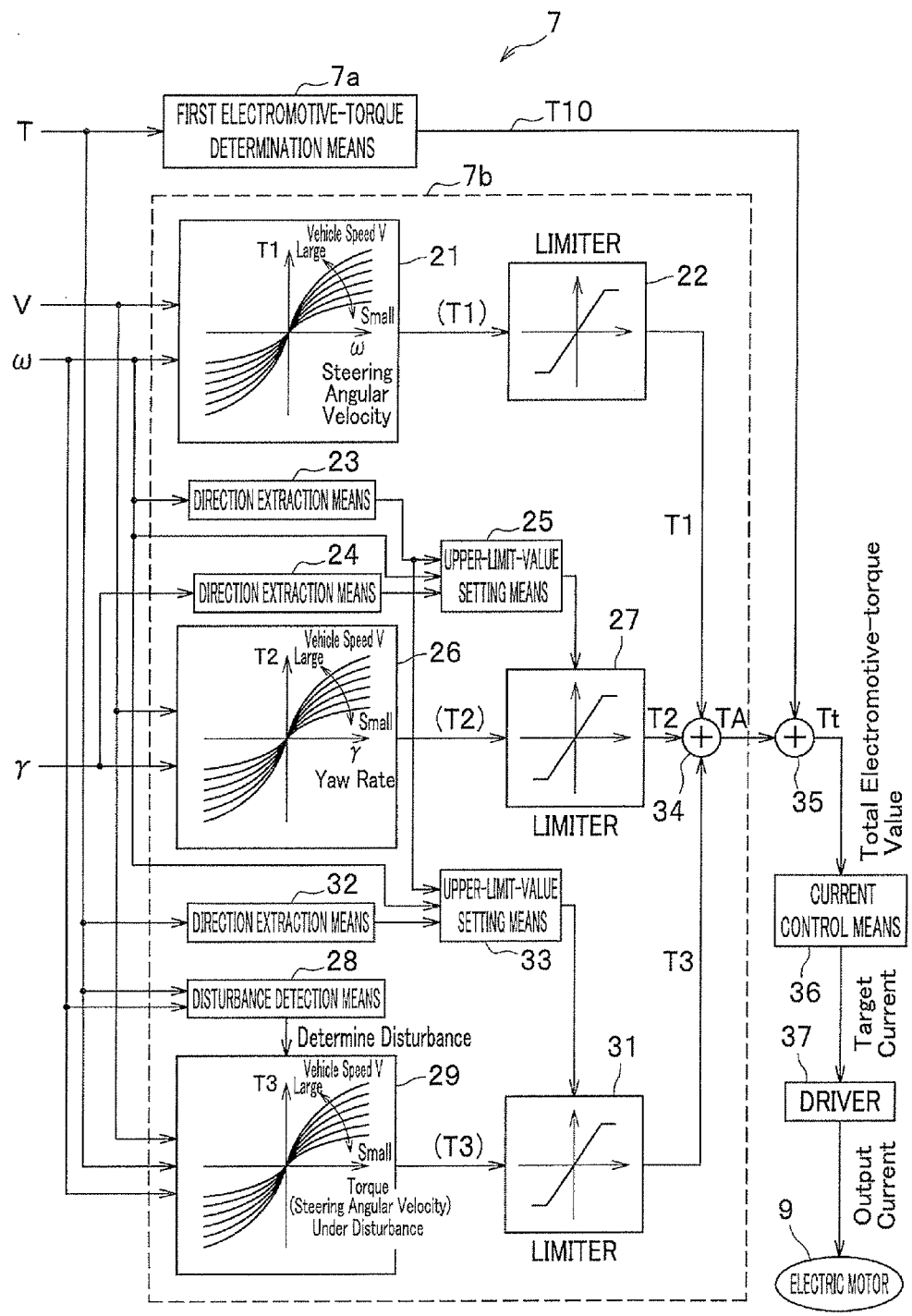
FIG. 2 is a diagram showing a configuration of a steering control unit installed in the vehicle steering device according to the embodiment of the present invention.

FIG. 2 is a diagram showing a configuration of the steering control unit 7 installed in the vehicle steering device 1 according to the embodiment of the present invention. The steering control unit 7 is composed of a first electromotive-torque determination means 7a, a second electromotive-torque determination means 7b, an adding means 35, and a current control means 36.

The first electromotive-torque determination means 7a determines the first electromotive-torque value (steering assist torque) T10 based on the detected and acquired steering torque T in order to reduce the driver's steering force.

In addition, when the vehicle 100 exhibits vehicle behavior such that the vehicle 100 is defected from a target travel line because of travelling on a rutted road or reception of a strong crosswind during travelling, the second electromotive-torque determination means 7b determines the second electromotive-torque value (steering reaction torque) TA for suppressing such vehicle behavior based on the aspects of the vehicle behavior such as the detected and acquired yaw rate $\gamma$.

The adding means 35 adds the second electromotive-torque value (steering reaction torque) TA to a first electromotive torque value (steering assist torque) T10 to obtain the total electromotive-torque value.

The current control means 36 determines target current supplied to the electric motor 9, in such a manner that the electric motor 9 can output the total electromotive torque corresponding to the total electromotive-torque value.

A driver 37 is composed of semiconductor switching circuits and the like, and arranged outside the steering control unit 7. The driver 37 supplies output current corresponding to the determined target current to the electric motor 9 based on the determined target current.

The electric motor 9 outputs the total electromotive torque corresponding to the total electromotive-torque value Tt, which is the sum of the first electromotive-torque value T10 and the second electromotive-torque value TA, so that the electric motor 9 can apply the total electromotive torque to the front wheels 6 (see FIG. 1).

Next, the second electromotive-torque determination means 7b will be explained in detail.

The second electromotive-torque value TA determined by the second electromotive-torque determination means 7b is calculated by an adding means 34 as the sum of first, second, and third torque values T1, T2, and T3.

First, the first torque value T1 is determined by a data table 21 and a limiter 22. The data table 21 can determine the first torque value T1 in accordance with the steering angular velocity $\omega$. Specifically, as indicated by the data table 21 in FIG. 2, the value of the first torque value T1 is set in such a manner that the first torque value T1 is increased with the steering angular velocity $\omega$. According to the above, the first torque value T1 can behave as the steering reaction torque. In addition, the data table 21 can increase or decrease (correct) the first torque value T1 according to the vehicle speed V. Specifically, as shown in FIG. 2, the value of the first torque value T1 is set in such a manner that the first torque value T1 is increased with the vehicle speed V. According to the above, when the vehicle 100 travels fast, the first torque value (steering reaction torque) T1 is increased, so that the driver can steer the vehicle 100 without feeling an uncomfortable feeling.

An upper-limit value is set in the limiter 22 in advance. The first torque value T1 determined by the data table 21 is input into the limiter 22. The limiter 22 determines whether or not the first torque value T1 is greater than the upper-limit value. When it is determined that the first torque value T1 is greater than the upper-limit value, the limiter 22 resets the first torque value T1 to a value equal to the upper-limit value, and outputs the reset first torque value T1 equal to the upper-limit value. When it is determined that the first torque value T1 is not greater than the upper-limit value, the limiter 22 outputs the first torque value T1 as it is.

The second torque value T2 is mainly determined by a data table 26 and a limiter 27. The data table 26 can determine the second torque value T2 according to the yaw rate $\gamma$. Specifically, as indicated by the data table 26 in FIG. 2, the value of the second torque value T2 is set in such a manner that the second torque value T2 is increased with the yaw rate $\gamma$. According to the above, for example, when the vehicle 100 receives a crosswind while the vehicle 100 is traveling, the yaw rate $\gamma$ is increased with the strength of the crosswind, the second torque value T2 can be set at a large value, and the second torque value T2 can behave as the steering reaction torque. Even if the vehicle 100 receives a strong crosswind, the driver will not lose the control of the vehicle 100 with the steering wheel 2 and can steer the vehicle 100 without feeling an uncomfortable feeling. In addition, the data table 26 can increase or decrease (correct) the second torque value T2 according to the vehicle speed V. Specifically, as shown in FIG. 2, the value of the second torque value T2 is set in such a manner that the second torque value T2 is increased with the vehicle speed V.

No constant upper-limit value is set in advance in the limiter 27. Direction extraction means 23 and 24 and an upper-limit-value setting means 25 determine an upper-limit value which is set in the limiter 27.

The direction extraction means 23 extracts, based on the steering angular velocity ω, whether the steering angular velocity ω is in the direction in which the steering wheel 2 rotates right (i.e., the positive (+) direction) or in the direction in which the steering wheel 2 rotates left (i.e., the negative (−) direction). According to the above, the direction extraction means 23 substantially extracts the steering direction of the manual steering means 10.

The direction extraction means 24 extracts, based on the yaw rate γ, whether the yaw rate γ is in the direction rotating the vehicle 100 right (i.e., the positive (+) direction) or in the direction rotating the vehicle 100 left (i.e., the negative (−) direction). According to the above, the direction extraction means 24 equivalently extracts the second torque value T2 and the direction in which the second electromotive-torque value TA rotate the vehicle 100.

The upper-limit-value setting means 25 changes the upper-limit value based on the combination of the second electromotive-torque value TA (the second torque value T2, the yaw rate γ) and the steering direction of the manual steering means 10 (the direction of the steering angular velocity ω), and sets the upper-limit values (an upper-limit value for the identical direction, an upper-limit value for the opposite direction) in the limiter 27. When the direction of the second electromotive-torque value TA (the second torque value T2, the yaw rate γ) is identical to the steering direction of the manual steering means 10 (the direction of the steering angular velocity ω), the upper-limit value for the identical direction is set in the limiter 27. When the direction of the second electromotive-torque value TA (the second torque value T2, the yaw rate γ) is opposite to the steering direction of the manual steering means 10, the upper-limit value for the opposite direction is set in the limiter 27.

Also, the steering angular velocity ω is input into the upper-limit-value setting means 25. The upper-limit-value setting means 25 corrects (changes) the upper-limit values (the upper-limit value for the identical direction, the upper-limit value for the opposite direction) based on the steering angular velocity ω (the steering speed of the manual steering means 10). Specifically, the upper-limit value for the identical direction, which is set when the direction of the second electromotive-torque value TA (the direction of the second torque value T2, the yaw rate γ) is identical to the steering direction of the manual steering means 10 (the direction of the steering angular velocity ω), is corrected to increase when the steering angular velocity ω is decreased. On the other hand, the upper-limit value for the opposite direction, which is set when the direction of the second electromotive-torque value TA (the direction of the second torque value T2, the yaw rate γ) is opposite to the steering direction of the manual steering means 10 (the direction of the steering angular velocity ω), is corrected to decrease when the steering angular velocity ω is decreased. Thus, when the direction of the steering angular velocity ω is changed between a rotation to the right (positive rotation) and a rotation to the left (negative rotation), it is possible to set intermediate values between the upper-limit value for the opposite direction and the upper-limit value for the identical direction (which is less than the upper-limit value for the opposite direction), and smoothly change the upper-limit value between the upper-limit value for the opposite direction and the upper-limit value for the identical direction. In addition, it is possible to avoid causing the driver to feel an uncomfortable feeling.

The second torque value T2 determined by the data table 26 is input into the limiter 27. The limiter 27 determines whether or not the second torque value T2 is greater than the upper-limit value (the upper-limit value for the identical direction, the upper-limit value for the opposite direction, or an intermediate value). When the second torque value T2 is greater than the upper-limit value (the upper-limit value for the identical direction, the upper-limit value for the opposite direction, or the intermediate value), the limiter 27 resets the second torque value T2 to a value equal to the upper-limit value (the upper-limit value for the identical direction, the upper-limit value for the opposite direction, or the intermediate value), and outputs as the second torque value T2 equal to the upper-limit value (the upper-limit value for the identical direction, the upper-limit value for the opposite direction, or the intermediate value). On the other hand, when the second torque value T2 is determined not to be greater than the upper-limit value (the upper-limit value for the identical direction, the upper-limit value for the opposite direction, or the intermediate value), the limiter 27 outputs the second torque value T2 as it is.

The third torque value T3 is mainly determined by a disturbance detection means 28, a data table 29, and a limiter 31. The disturbance detection means 28 detects occurrence of a disturbance such as a kickback. When the disturbance detection means 28 detects occurrence of a disturbance, the disturbance detection means 28 transmits (a signal indicating) a determination of the disturbance to the data table 29. The construction of the disturbance detection means 28 will be explained later.

The data table 29 can determine the third torque value T3 according to the steering torque T and the steering angular velocity ω at the time of detecting the disturbance. The data table 29 determines the third torque value T3 at the timing at which the data table 29 receives (the signal indicating) a determination of the disturbance. Specifically, as indicated by the data table 29 in FIG. 2, the third torque value T3 is set in such a manner that the third torque value T3 is increased with the steering torque T or the steering angular velocity ω at the time of detecting the disturbance. According to the above, for example, when the vehicle 100 receives a disturbance such as a kickback while the vehicle 100 is traveling, the stronger the disturbance (such as a kickback), the larger the steering torque T or the larger the steering angular velocity ω. Therefore, the large third torque value T3 can be set. The third torque value T3 can behave as the steering reaction torque. Therefore, even if the disturbance (such as a kickback) is strong, the driver does not lose the control of the steering wheel 2, and can steer the vehicle 100 without feeling an uncomfortable feeling.

In addition, the third torque value T3 in the data table 29 can be increased or decreased (corrected) according to the vehicle speed V. Specifically, the third torque value T3 is set in such a manner that the third torque value T3 is increased with the vehicle speed V as indicated by the data table 29 in FIG. 2.

No constant upper-limit value is set in advance in the limiter 31. The direction extraction means 23, a direction extraction means 32, and an upper-limit-value setting means 33 determine an upper-limit value which is set in the limiter 31. Since the direction extraction means 23 is explained before, the detailed explanation thereof will be omitted here.

The direction extraction means 32 extracts, based on the steering torque T or the steering angular velocity ω (the steering torque T in the example of FIG. 2) at the time of detecting the disturbance, whether the steering torque T is in the direction in which the steering wheel 2 rotates right (i.e., the positive (+) direction) or in the direction in which the steering wheel 2 rotates left (i.e., the negative (−) direction). According to the above, the direction extraction means 32 equivalently extracts the third torque value T3, and the direction in which the second electromotive-torque value TA rotate the vehicle 100.

The upper-limit-value setting means 33 changes the upper-limit value based on the combination of the direction of the second electromotive-torque value TA (the direction of the third torque value T3, the direction of the steering torque T, or the steering angular velocity ω) at the time of detecting the disturbance and the steering direction of the manual steering means 10 (i.e., the direction of the steering angular velocity ω) before and after the time of the detecting the disturbance. That is, the upper-limit-value setting means 33 sets the different upper-limit value (an upper-limit value for the identical direction, an upper-limit value for the opposite direction) according to the combination in the limiter 31. When the direction of the second electromotive-torque value TA (the direction of the third torque value T3, the direction of the steering torque T, or the steering angular velocity ω) at the time of detecting the disturbance is identical to the steering direction of the manual steering means 10 (the direction of the steering angular velocity ω) before and after the time of the detecting the disturbance, the upper-limit value for the identical direction is set in the limiter 31. When the direction of the second electromotive-torque value TA (the third torque value T3, the steering torque T, or the steering angular velocity ω) is opposite to the steering direction of the manual steering means 10, the upper-limit value for the opposite direction is set in the limiter 31.

Also, the steering angular velocity ω is input into the upper-limit-value setting means 33. The upper-limit-value setting means 33 corrects (changes) the upper-limit value (the upper-limit value for the identical direction, the upper-limit value for the opposite direction) based on the steering angular velocity ω (the steering speed of the manual steering means 10). Specifically, the upper-limit value for the identical direction, which is set when the direction of the second electromotive-torque value TA (the direction of the third torque value T3, the direction of the steering torque T, or the steering angular velocity ω) is identical to the steering direction of the manual steering means 10 (the direction of the steering angular velocity ω), is corrected to increase when the steering angular velocity ω is decreased. On the other hand, the upper-limit value for the opposite direction, which is set when the direction of the second electromotive-torque value TA (the direction of the third torque value T3, the direction of the steering torque T, or the steering angular velocity ω) is opposite to the steering direction of the manual steering means 10 (the direction of the steering angular velocity ω), is corrected to decrease when the steering angular velocity ω is decreased. According to the above, when the direction of the steering angular velocity ω is changed between a rotation to the right (positive rotation) and a rotation to the left (negative rotation), it is possible to set intermediate values between the upper-limit value for the opposite direction and the upper-limit value for the identical direction (which is less than the upper-limit value for the opposite direction), and smoothly change the upper-limit value between the upper-limit value for the opposite direction and the upper-limit value for the identical direction. In addition, it is possible to avoid causing the driver to feel an uncomfortable feeling.

The third torque value T3 determined by the data table 29 is input into the limiter 31. The limiter 31 determines whether or not the third torque value T3 is greater than the upper-limit value (the upper-limit value for the identical direction, the upper-limit value for the opposite direction, or an intermediate value). When the third torque value T3 is greater than the upper-limit value (the upper-limit value for the identical direction, the upper-limit value for the opposite direction, or the intermediate value), the limiter 31 resets the third torque value T3 to a value equal to the upper-limit value (the upper-limit value for the identical direction, the upper-limit value for the opposite direction, or the intermediate value), and outputs as the third torque value T3 equal to the upper-limit value (the upper-limit value for the identical direction, the upper-limit value for the opposite direction, or the intermediate value). On the other hand, when the third torque value T3 is not greater than the upper-limit value (the upper-limit value for the identical direction, the upper-limit value for the opposite direction, or the intermediate value), the limiter 31 outputs the third torque value T3 as it is.

The adding means 34 adds the first torque value T1, the second torque value T2, and the third torque value T3 to obtain the second electromotive-torque value TA.

Figure 3:
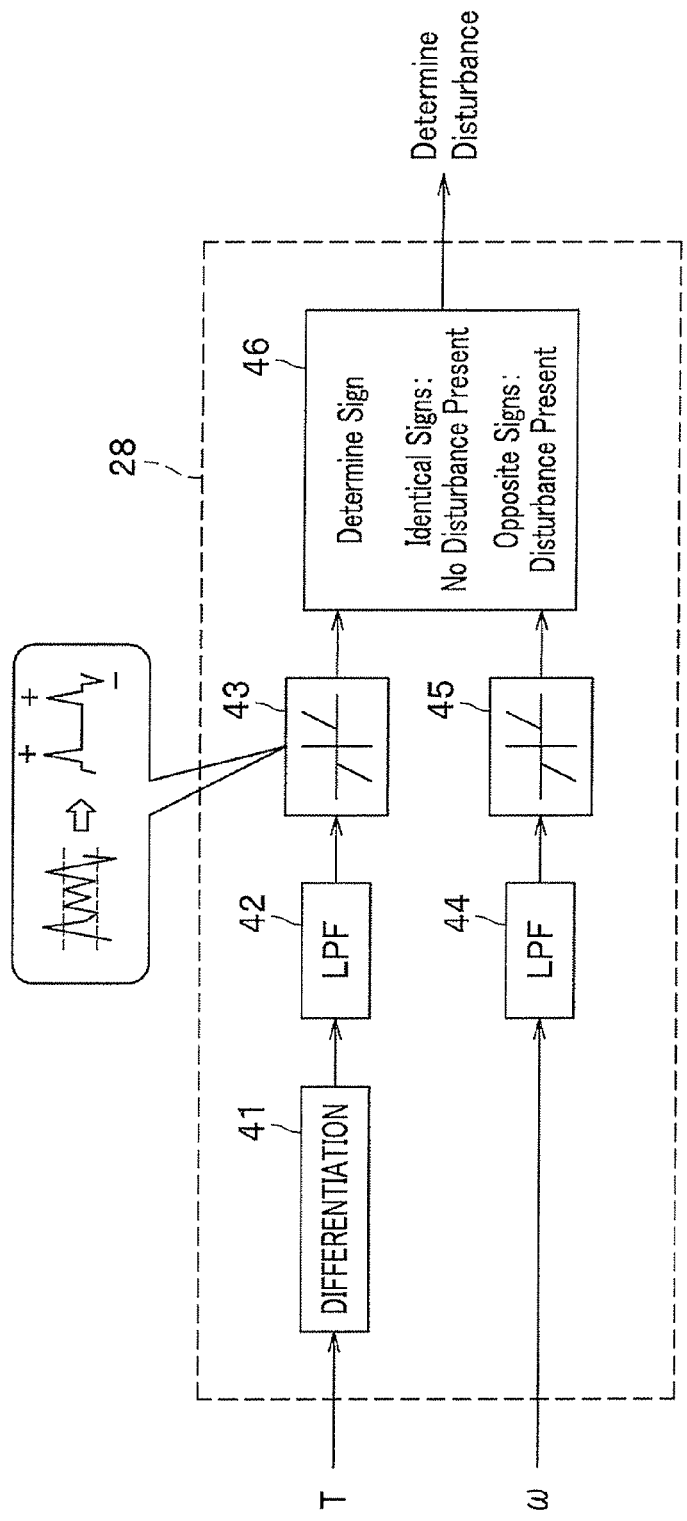
FIG. 3 is a diagram showing a configuration of a (first) disturbance detection means used in the steering control unit.
Figure 4:
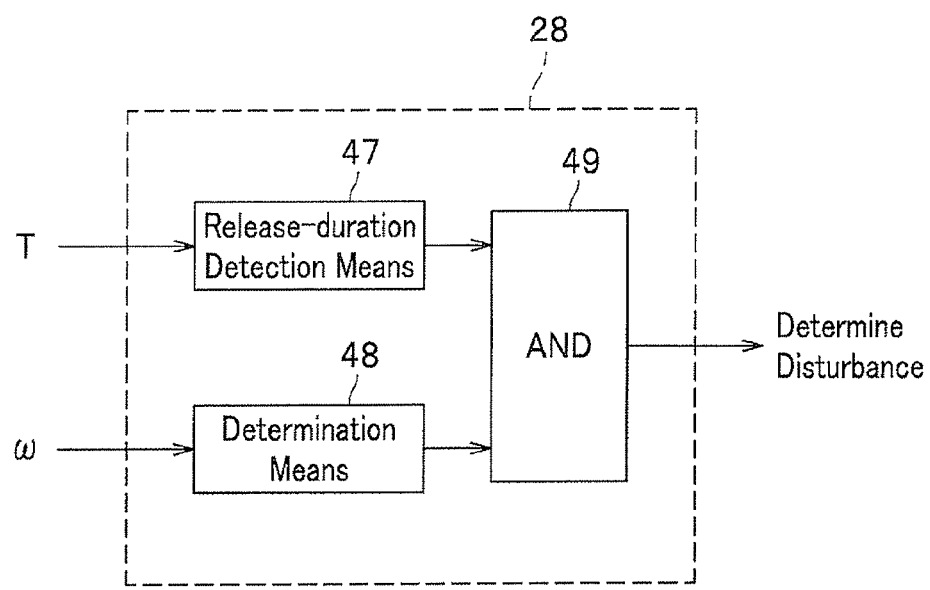
FIG. 4 is a diagram showing a configuration of a (second) disturbance detection means used in the steering control unit.

FIG. 3 is a diagram showing a configuration of the (first) disturbance detection means 28 (while the steering wheel is held by the driver), and FIG. 4 is a diagram showing a configuration of the disturbance detection means 28 (while the steering wheel is released from the driver). Each of the configurations shown in FIGS. 3 and 4 is used as the disturbance detection means 28 in FIG. 2. The first disturbance detection means 28 shown in FIG. 3 is used when the driver grips the steering wheel 2 and controls (restricts) the rotation of the steering wheel 2, and the second disturbance detection means 28 shown in FIG. 4 is used when the driver releases and does not grip the steering wheel 2 and does not control (restrict) the rotation of the steering wheel 2.

The first disturbance detection means 28 shown in FIG. 3 (which is used while the steering wheel is held by the driver) has a differentiating means 41, an LPF (low-pass filter) 42, and a filter 43. The differentiating means 41 calculates a (time) derivative of the detected steering torque T. The LPF 42 performs filtering of the (time) derivative of the detected steering torque T so as to transmit low-frequency components of the derivative. The filter 43 performs filtering of the low-frequency components of the derivative so as to transmit large-amplitude waveforms in the low-frequency components. The filtering by the above filters can extract steering torque T which suddenly varies because of a kickback or the like.

Also, the first disturbance detection means 28 shown in FIG. 3 has an LPF 44 and a filter 45. The LPF 44 performs filtering of the steering angular velocity ω so as to transmit low-frequency components of the steering angular velocity ω. The filter 45 performs filtering of the low-frequency components of the steering angular velocity ω so as to transmit large-amplitude waveforms in the low-frequency components. The filtering by the above filters can extract high steering angular velocities ω which are caused by a kickback or the like.

In addition, the first disturbance detection means 28 shown in FIG. 3 has a sign determination means 46. The sign determination means 46 acquires the rapidly varying steering torque T from the filter 43, and the high steering angular velocities ω from the filter 45. Then, the sign determination means 46 determines whether the direction of rotation of a rapidly varying steering torque T (rotation to the right (positive sign) or rotation to the left (negative sign)) is identical (identical signs) or opposite (opposite signs) to the direction of rotation of a high steering angular velocity ω (rotation to the right (positive sign) or rotation to the left (negative sign)) detected at the same timing of detecting the rapidly varying steering torque T. When the above directions are determined to be identical, the first disturbance detection means 28 determines that no disturbance occurs while the driver grips the steering wheel 2 for controlling the rotation of the steering wheel 2. When the above directions are determined to be opposite, it is possible to consider that a torque is caused by a disturbance while the driver grips the steering wheel 2 for controlling the rotation of the steering wheel 2, so that the first disturbance detection means 28 determines (detects) that a disturbance occurs, and transmits (a signal indicating) the determination of a disturbance to the data table 29.

Next, the second disturbance detection means 28 shown in FIG. 4 is used while the steering wheel is released from the driver and the driver does not grip the steering wheel 2 and does not restrict the rotation of the steering wheel 2. The second disturbance detection means 28 shown in FIG. 4 has a release-duration detection means 47, a determination means 48, and a logical product means (AND) 49. The release-duration detection means 47 detects a state in which the steering torque T is equal to or less than a torque threshold value for a predetermined time (i.e., a state in which the driver releases the steering wheel 2). The determination means 48 determines whether or not the steering angular velocity ω is greater than a velocity threshold value. In the state in which the steering torque T is equal to or less than the torque threshold value for the predetermined time (i.e., in the state in which the driver releases the steering wheel 2) and the steering angular velocity ω is greater than the velocity threshold value, the second disturbance detection means 28 determines (detects) that a disturbance occurs, and transmits (a signal indicating) the determination of a disturbance to the data table 29.

Figure 5:
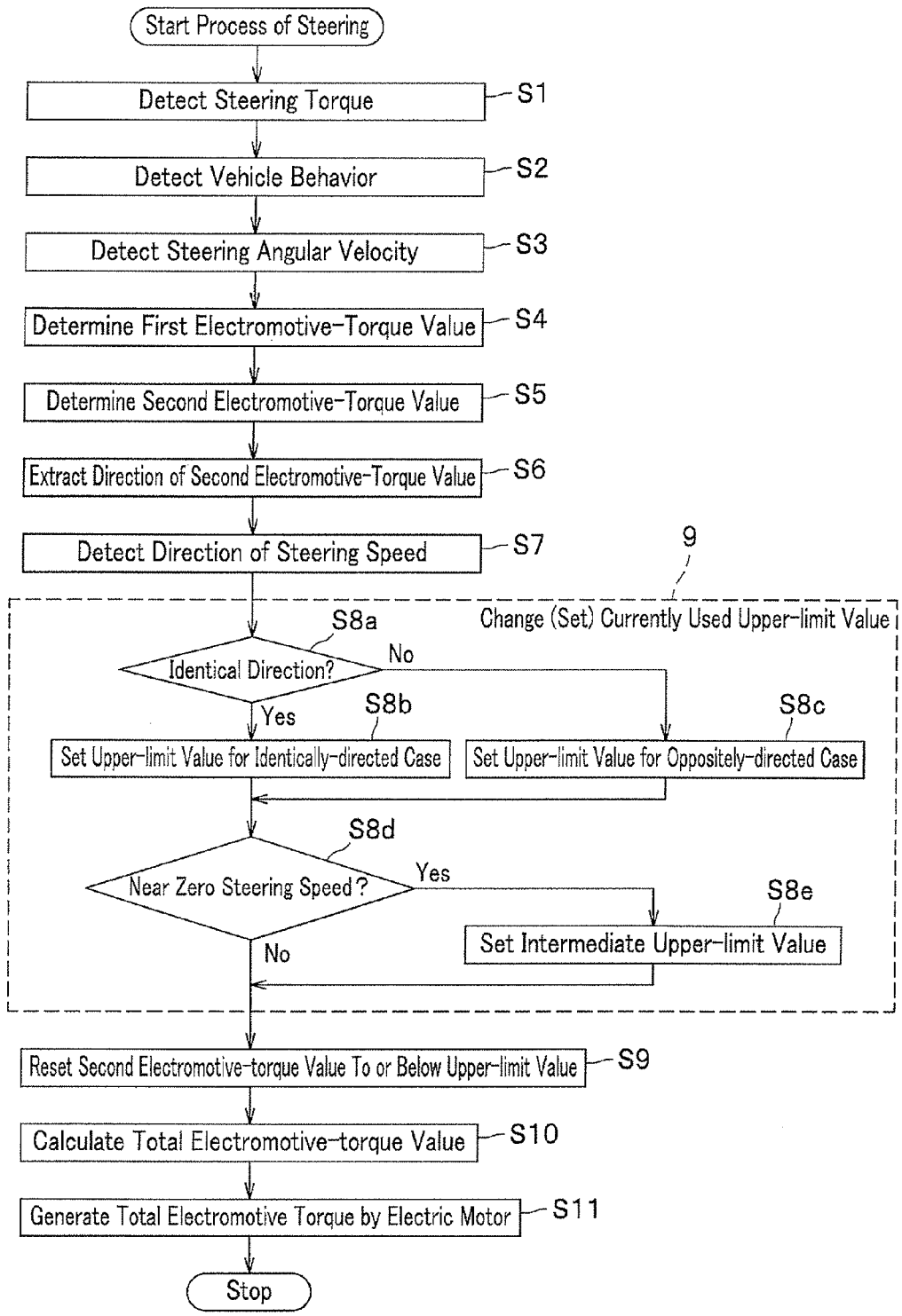
FIG. 5 is a flowchart showing a steering method executed by the vehicle steering device (in the vehicle) according to the embodiment of the present invention.

FIG. 5 is a flowchart showing a steering method executed by the vehicle steering device 1 (in the vehicle 100) according to the embodiment of the present invention.

First, in step S1, the torque sensor (steering-torque detection means) 12 detects the steering torque T, and the first electromotive-torque determination means 7a and the second electromotive-torque determination means 7b in the steering control unit 7 acquire the detected steering torque T from the torque sensor (steering torque detection means) 12.

In step S2, the yaw-rate sensor (vehicle-behavior detection means) 15 detects the yaw rate γ, and the vehicle-speed sensor (vehicle-behavior detection means) 16 detects the vehicle speed V. The second electromotive-torque determination means 7b in the steering control unit 7 acquires the yaw rate γ, the vehicle speed V, and the like for detecting the vehicle behavior (affected by crosswinds, wheel tracks, and disturbances (kickbacks)).

In step S3, the steering-angular-velocity sensor 11 or the resolver (steering-angular-velocity sensor) 9a detects the steering angular velocity ω. The second electromotive-torque determination means 7b in the steering control unit 7 acquires the detected steering angular velocity ω from the steering-angular-velocity sensor 11 or the resolver (steering-angular-velocity sensor) 9a.

In step S4, the first electromotive-torque determination means 7a determines the first electromotive-torque value T10 (the so-called assist torque) based on the steering torque T.

In step S5, the data table 21 and the limiter 22 in the second electromotive-torque determination means 7b temporarily determine the first torque value T1 constituting the second electromotive-torque value TA based on the vehicle speed V and the steering angular velocity ω. In addition, the data table 26 in the second electromotive-torque determination means 7b temporarily determines the second torque value T2 constituting the second electromotive-torque value TA based on the vehicle speed V and the yaw rate γ.

Figure 6:
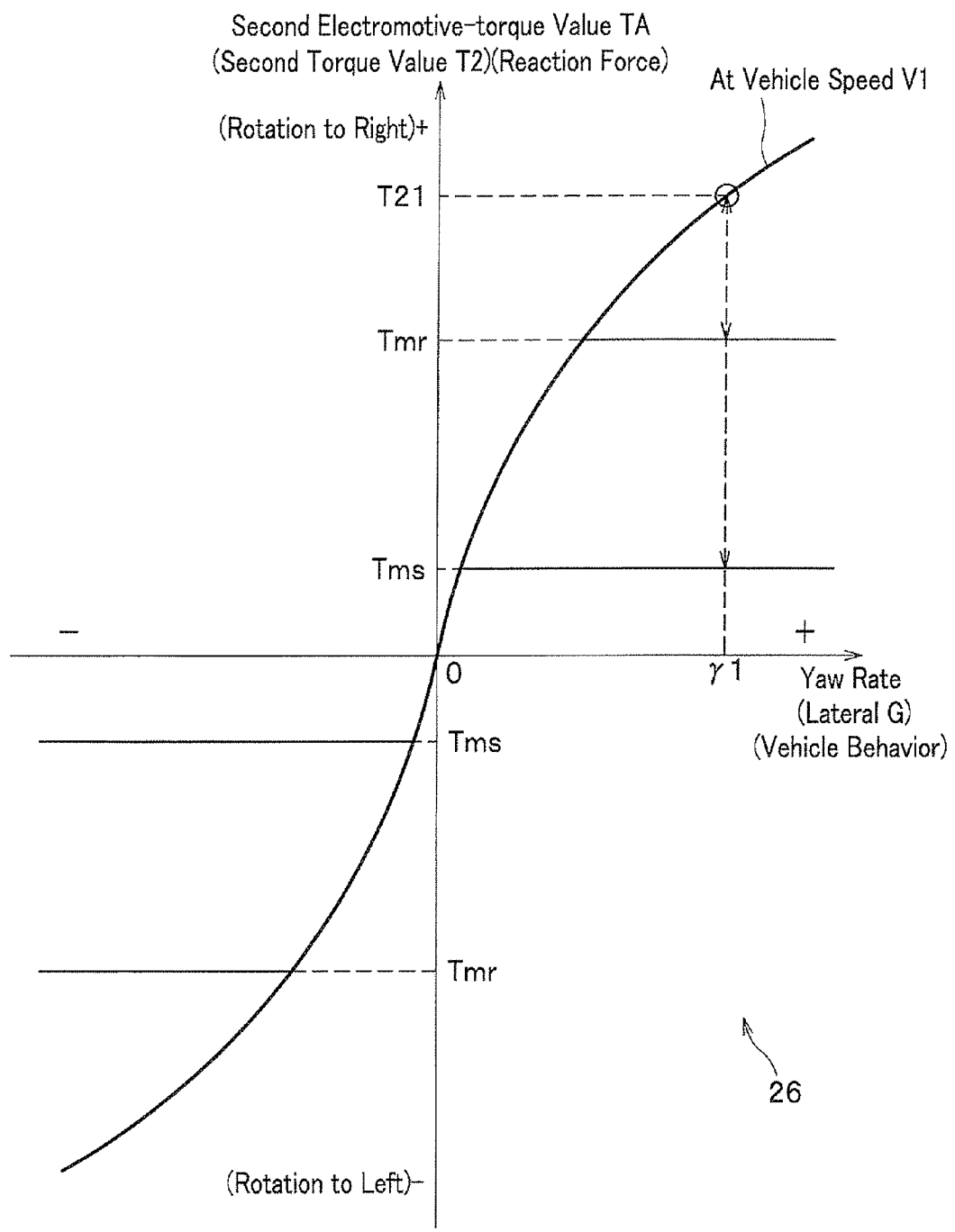
FIG. 6 is a graph (in a data table) showing the second electromotive-torque value versus the yaw rate, and is presented for explaining a method for setting the second electromotive-torque value.

FIG. 6 is a graph showing a relationship in the data table 26 (see FIG. 2), which can determine the second torque value T2 constituting the second electromotive-torque value TA in accordance with the acquired yaw rate γ. In addition, as an example, the data table 26 shows a data table for the vehicle speed V1. In the data table 26, the second torque value T2 is increased with the yaw rate γ (the lateral acceleration (lateral G)). When the detected vehicle speed V1 and yaw rate γ1 are acquired, the second torque value T21 is temporarily determined by the data table 26 based on the vehicle speed V1 and the yaw rate γ1 as shown in FIG. 6.

Also, in step S5, the disturbance detection means 28 in the second electromotive-torque determination means 7b detects a disturbance. Details of first and second method for detecting a disturbance performed by the first and second disturbance detection means 28 will bee explained later. When a disturbance is detected, the data table 29 in the second electromotive-torque determination means 7b temporarily determine the third torque value T3 constituting the second electromotive-torque value TA based on the vehicle speed V, the steering torque T, and the steering angular velocity ω at the time of the occurrence of the disturbance.

Figure 7:
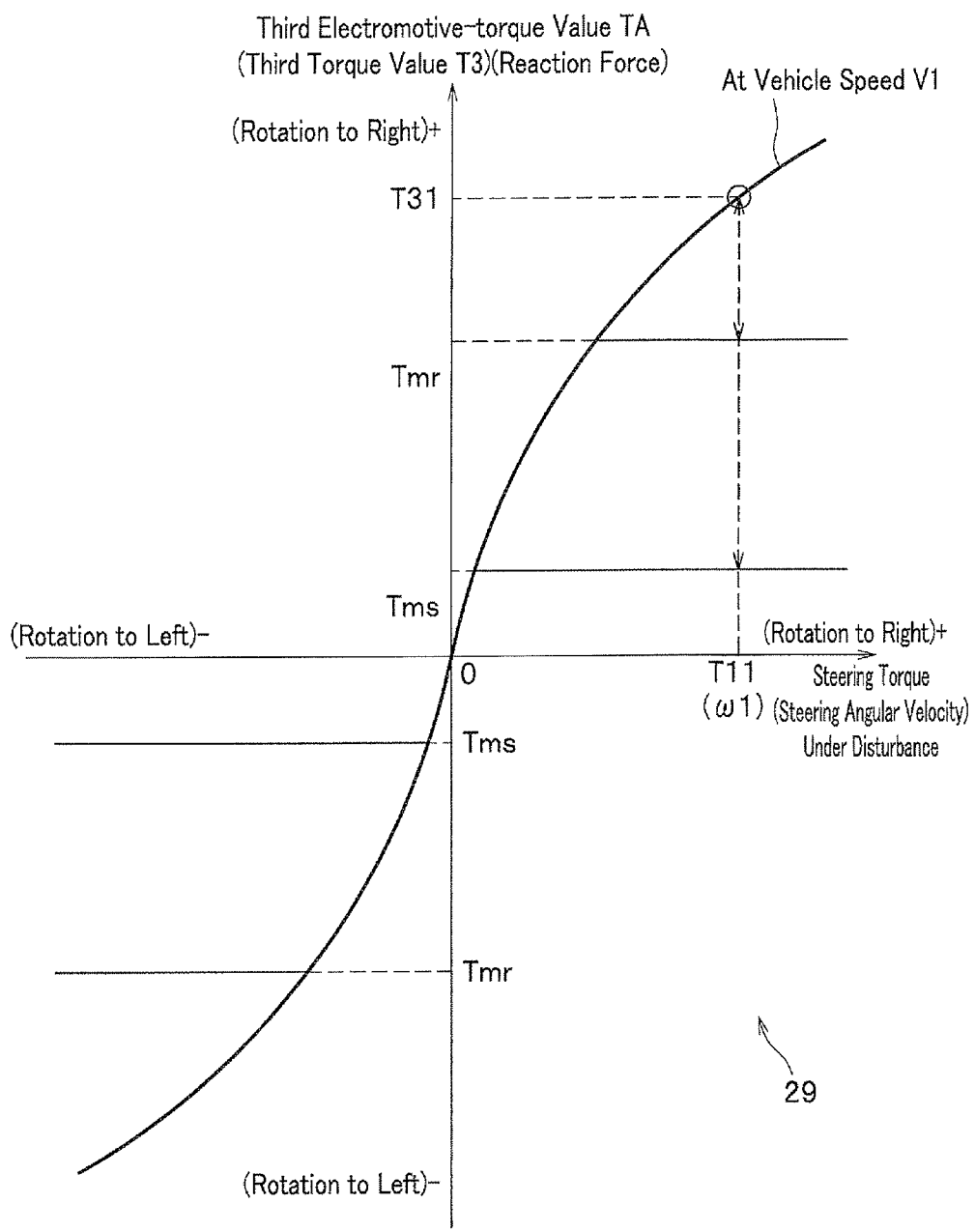
FIG. 7 is a graph (in a data table) showing the second electromotive-torque value versus the steering torque (steering angular velocity) under a disturbance, and presented for explaining a method for setting the second electromotive-torque value.

FIG. 7 is a graph showing a relationship in the data table 29 (see FIG. 2), which can determine the third torque value T3 constituting the second electromotive-torque value TA in accordance with the steering torque T (the steering angular velocity ω) acquired at the time of the occurrence of the disturbance (e.g., a kickback). In addition, as an example, the data table 29 shows a data table for the vehicle speed V1. In the data table 29, the third torque value T3 is increased with the steering torque T (the steering angular velocity ω). When the vehicle speed V1 and the steering torque T (the steering angular velocity ω) which are detected are acquired, the third torque value T31 is temporarily determined by the data table 29 based on the vehicle speed V1 and the steering torque T11 (the steering angular velocity ω1) as shown in FIG. 7.

Next, in step S6 in FIG. 5, the direction extract means 24 in the second electromotive-torque determination means 7b extracts the direction of the second torque value T2 constituting the second electromotive-torque value TA based on the yaw rate γ. In addition, the direction extract means 32 in the second electromotive-torque determination means 7b extracts the direction of the third torque value T3 constituting the second electromotive-torque value TA based on the steering torque T at the time of detecting the disturbance.

In step S7, the direction extract means 23 in the second electromotive-torque determination means 7b detects the direction of the steering angular velocity ω (the steering direction of the manual steering means 10) based on the steering angular velocity ω.

In step S8, the upper-limit-value setting means 25 in the second electromotive-torque determination means 7b updates the currently used upper-limit value (the upper-limit value for the identical direction, the upper-limit value for the opposite direction, or an intermediate value) of the second torque value T2, and sets the updated upper-limit value in the limiter 27. In addition, the upper-limit value setting means 33 in the second electromotive-torque determination means 7b updates the currently used upper-limit value (the upper-limit value for the identical direction, the upper-limit value for the opposite direction, or an intermediate value) of the third torque value T3, and sets the updated upper-limit value in the limiter 31. Further details of the operations in step S8 will be explained below.

First, in step S8a, the upper-limit-value setting means 25 determines whether or not the direction of the second torque value T2 constituting the second electromotive-torque value TA extracted in step S6 is identical to the direction of the steering angular velocity ω (the steering direction of the manual steering means 10) detected in step S7. When the above directions are determined to be identical (i.e., "Yes" in step S8a), the process proceeds to step S8b. When the above directions are determined to be different (opposite) (i.e., "No" in step S8a), the process proceeds to step S8c.

In addition, in step S8a, the upper-limit-value setting means 33 determines whether or not the direction of the third torque value T3 constituting the second electromotive-torque value TA extracted in step S6 is identical to the direction of the steering angular velocity ω (the steering direction of the manual steering means 10) detected in step S7. When the above directions are determined to be identical (i.e., "Yes" in step S8a), the process proceeds to step S8b. When the above directions are determined to be different (opposite) (i.e., "No" in step S8a), the process proceeds to step S8c.

In step S8b, the upper-limit-value setting means 25 sets the upper-limit values for the identical direction in the limiters 27 and 31. Specifically, the upper-limit value for the identical direction Tms is set for the second torque value T2 constituting the second electromotive-torque value TA as shown in FIG. 6. In addition, the upper-limit value for the identical direction Tms is set for the third torque value T3 constituting the second electromotive-torque value TA as shown in FIG. 7.

Figure 8:
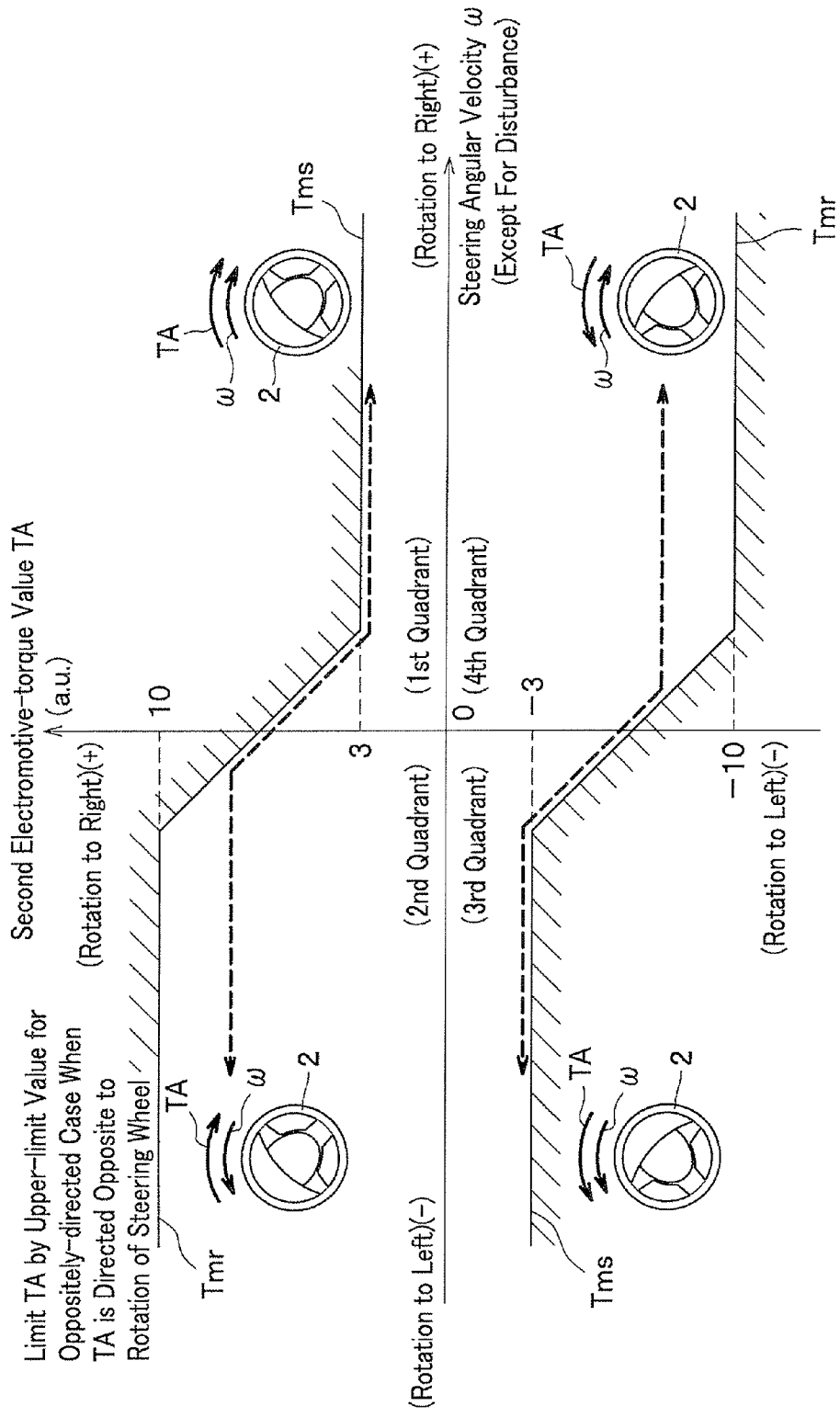
FIG. 8 is a graph showing the second electromotive-torque value versus the steering angular velocity, and presented for explaining a method for setting the upper-limit value of the second electromotive-torque value, where the upper-limit value is different according to the combination of the positive and negative signs of the steering angular velocity and the positive and negative signs of the second electromotive-torque value.

FIG. 8 is a graph (in a data table) of the second electromotive-torque value TA (the second torque value T2, the third torque value T3) versus the steering angular velocity ω.

When "Yes" is determined in step S8a, and the process proceeds to step S8b, the upper-limit value Tms for the identical direction is set at, for example, three in an arbitrary scale (which corresponds to +3 in the first quadrant and −3 in the third quadrant in FIG. 8) as shown in the first and third quadrants of the graph of FIG. 8, if the direction of the second electromotive-torque value TA (the second torque value T2, the third torque value T3) and the direction of the steering angular velocity ω both correspond to a rotation to the right (the positive direction)(see the first quadrant in FIG. 8), and if the direction of the second electromotive-torque value TA (the second torque value T2 or the third torque value T3) and the direction of the steering angular velocity ω both correspond to a rotation to the left (the negative direction) (see the third quadrant in FIG. 8).

Also, in step S8c in FIG. 5, the upper-limit-value setting means 25 sets the upper-limit values for the opposite direction in the limiters 27 and 31. Specifically, the upper-limit value for the opposite direction Tmr is set for the second torque value T2 constituting the second electromotive-torque value TA as shown in FIG. 6. In addition, the upper-limit value for the opposite direction Tmr is set for the third torque value T3 constituting the second electromotive-torque value TA as shown in FIG. 7.

When "No" is determined in step S8a in FIG. 5, and the process proceeds to step S8c, the upper-limit value Tmr for the opposite direction is set at, for example, ten in an arbitrary scale (which corresponds to +10 in the second quadrant and −10 in the fourth quadrant in FIG. 8) as shown in the second and fourth quadrants of the graph of FIG. 8, where the upper-limit value Tmr for the opposite direction is greater than the upper-limit value Tms for the identical direction, if one of the direction of the second electromotive-torque value TA (the second torque value T2, the third torque value T3) and the direction of the steering angular velocity ω corresponds to a rotation to the right (the positive direction) and the other of the directions corresponds to the different (opposite) direction, i.e., a rotation to the left (the negative direction).

In step S8d in FIG. 5, the upper-limit-value setting means 25 determines whether or not the steering angular velocity ω is near zero. When the steering angular velocity ω is near zero (i.e., "Yes" in step S8d), the process proceeds to step S8e. When the steering angular velocity ω is not near zero (i.e., "No" in step S8d), the process proceeds to step S9.

In step S8e, the upper-limit-value setting means 25 sets, in a vicinity of the zero steering angular velocity ω, intermediate values depending on the steering angular velocity ω, instead of the upper-limit value for the identical direction or the upper-limit value for the opposite direction, in such a manner that the intermediate values smoothly connect the upper-limit value for the identical direction and the upper-limit value for the opposite direction. Specifically, as shown in FIG. 8, the upper-limit value for the identical direction Tms is modified in such a manner that an absolute value of the upper-limit value for the identical direction Tms in the vicinity of the zero steering angular velocity ω is increased with decrease in the steering angular velocity ω, and an absolute value of the upper-limit value for the opposite direction Tmr in the vicinity of the zero steering angular velocity ω is decreased with decrease in the steering angular velocity ω.

In step S9 in FIG. 5, the limiter 27 resets the second torque value T2 constituting the second electromotive-torque value TA to a value equal to or less than the upper-limit value (the upper-limit value for the identical direction, the upper-limit value for the opposite direction, or an intermediate value). Specifically, as shown in FIG. 6, the second torque value T21, which is temporarily set for the second torque value T2 constituting the second electromotive-torque value TA, is reset by the limiter 27 to the upper-limit value for the identical direction Tms, the upper-limit value for the opposite direction Tmr, or an intermediate value.

In addition, the limiter 31 resets the third torque value T3 constituting the second electromotive-torque value TA to a value equal to or less than the upper-limit value (the upper-limit value for the identical direction, the upper-limit value for the opposite direction, or an intermediate value). Specifically, the third torque value T31, which is temporarily set for the third torque value T3 constituting the second electromotive-torque value TA, is reset by the limiter 31 to the upper-limit value for the identical direction Tms, the upper-limit value for the opposite direction Tmr, or an intermediate value.

According to the above, for example, as shown by two dashed arrows for rotations to right and left of the second electromotive-torque value TA in FIG. 8, when the steering angular velocity ω is changed between a rotation to the right (the positive direction) and a rotation to the left (the negative direction), the upper-limit value can be set to smoothly change from the small upper-limit value for the identical direction Tms to the large upper-limit value for the opposite direction Tmr through the smoothly arranged intermediate values. As a result, the limited the second electromotive-torque value TA (the second torque value T2, the third torque value T3; corresponding to the dashed arrows) can be set smoothly. Thus, the driver will not feel an uncomfortable feeling.

In step S10, the adding means 34 adds the first torque value T1, the second torque value T2, and the third torque value T3 to obtain the second electromotive-torque value TA (TA=T1+T2+T3). In addition, the adding means 35 adds the first electromotive-torque value T10 and the second electromotive-torque value TA to obtain the total electromotive-torque value Tt (Tt=T10+TA).

In step S11, the current control means 36 determines the target current supplied to the electric motor 9 based on the total electromotive-torque value Tt. The driver 37 supplies an output current to the electric motor 9 based on the determined target current. The electric motor 9 outputs a total electromotive torque corresponding to the total electromotive-torque value Tt obtained by summing the first electromotive torque value T10 and the second electromotive-torque value TA.

Figure 9:
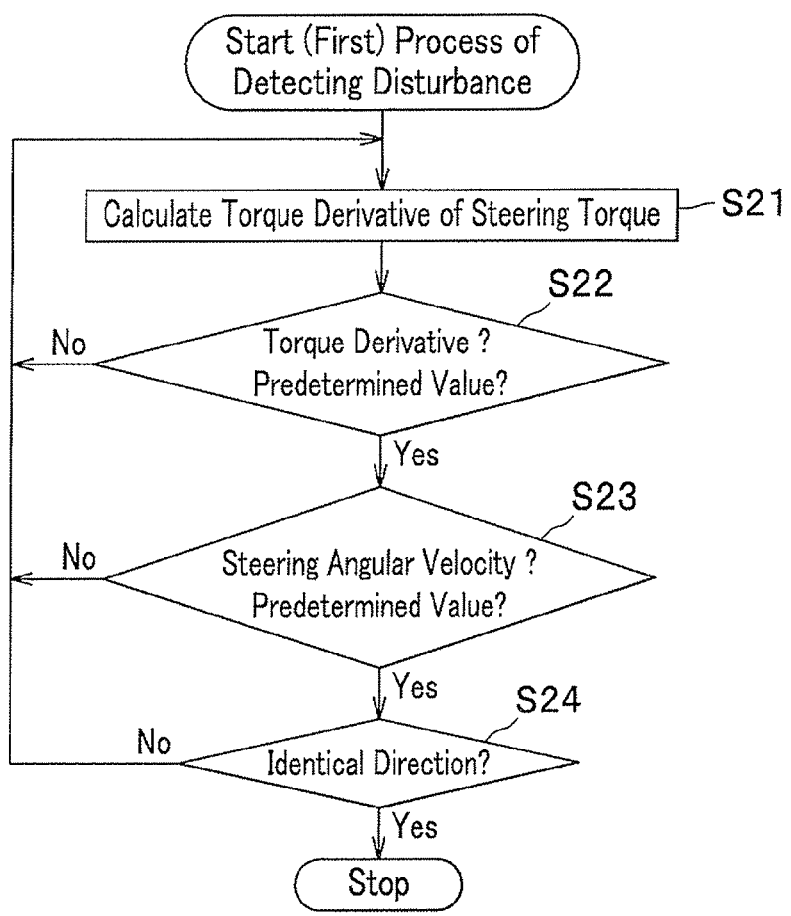
FIG. 9 is a flowchart showing a (first) method for detecting a disturbance, the method is executed by the (first) disturbance detection means.

FIG. 9 is a flowchart showing a (first) method for detecting a disturbance, the method is executed by the (first) disturbance detection means 28 shown in FIG. 3. The method of FIG. 9 corresponds to a part of the step S5 in FIG. 5.

First, in step S21, the differentiating means 41 calculates the (time) derivative of the steering torque T (torque derivative). The LPF 42 performs filtering which transmits low-frequency components of the torque derivative.

In step S22, the filter 43 determines whether or not an absolute value of the torque derivative is greater than a predetermined value, and the filter 43 performs filtering which extracts and transmits the torque derivative greater than the predetermined value ("Yes" in step S22). That is, the filter 43 behaves as a filter which transmits large-amplitude waveforms in the low-frequency components of the torque derivative and extracts rapidly varying steering torque T caused by a kickback and the like. When "No" is determined in step S22, the process returns to step S21.

In step S23, the LPF 44 performs filtering which transmits low-frequency components of the steering angular velocity ω. The filter 45 determines whether or not an absolute value of the steering angular velocity ω is greater than a predetermined value, and the filter 45 performs filtering which extracts the steering angular velocity ω whose absolute value is greater than the predetermined value (based on the yes determination in step S23). That is, the filter 45 has the function of a filter which transmits large-amplitude waveforms in the low-frequency components of the steering angular velocity ω, and thus high steering angular velocities ω caused by a kickback and the like are extracted. When "No" is determined in step S23, the operation goes back to step S21.

In step S24, the sign determination means 46 determines whether or not the direction of rotation (the positive or negative sign) of the rapidly varying steering torque T which the filter 43 transmits in step S22 is identical to the direction of rotation (the positive or negative signs) of a high steering angular velocity ω which the filter 45 transmits in step S23. When the above directions are determined to be identical (identical signs), the sign determination means 46 determines that no disturbance occurs while the driver grips the steering wheel 2 for controlling the rotation of the steering wheel 2. When the above directions are determined to be opposite (opposite signs), it is possible to consider that the oppositeness is caused by a disturbance while the driver grips the steering wheel 2 for controlling the rotation of the steering wheel 2, so that the sign determination means 46 determines (detects) that a disturbance occurs, and transmits (a signal indicating) the determination of a disturbance to the data table 29. Thus, the (first) method for detecting a disturbance is completed.

Figure 10:
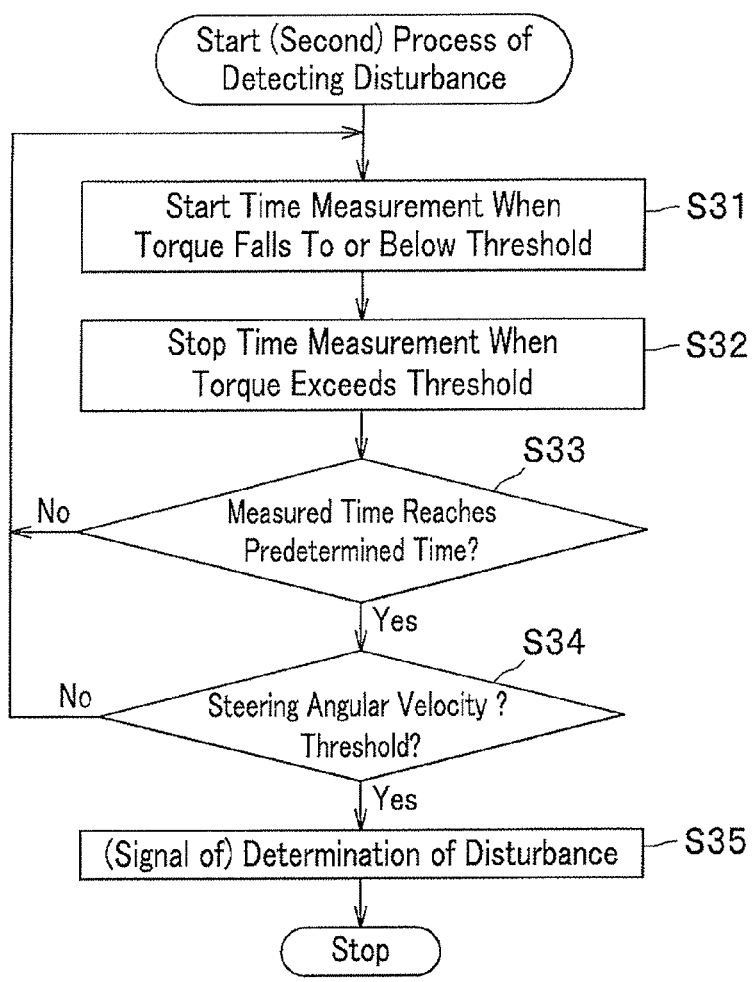
FIG. 10 is a flowchart showing a (second) method for detecting a disturbance, the method is executed by the (second) disturbance detection means.

FIG. 10 is a flowchart showing a (second) method for detecting a disturbance, the method is executed by the (second) disturbance detection means 28. The method of FIG. 10 corresponds to a part of the step S5 in FIG. 5.

At first, in step S31, when an absolute value of the steering torque T becomes equal to or less than a threshold value, the release-duration detection means 47 starts time measurement.

In step S32, when the absolute value of the steering torque T exceeds the threshold value, the release-duration detection means 47 stops the time measurement. By the time measurement, the release duration (measured time) for which the driver does not hold the steering wheel 2 and lets the steering wheel 2 freely rotate can be measured.

In step S33, the release-duration detection means 47 determines whether the measured time (the release duration) reaches a predetermined time. When it is determined that the measured time (the release duration) reaches the predetermined time (i.e., "Yes" in step S33), a first input of the AND 49 is set to "1", and the process proceeds to step S34. When it is determined that the measured time (the release duration) does not reach the predetermined time (i.e., "No" in step S33), the first input of the AND 49 is set to "0", and the process returns to step S31.

In step S34, the determination means 48 determines whether or not an absolute value of the steering angular velocity ω is equal to or greater than a threshold value. When it is determined that the absolute value of the steering angular velocity ω is equal to or greater than the threshold value (i.e., "Yes" in step S34), a second input of the AND 49 is set to "1", and the process proceeds to step S35. When it is determined that the absolute value of the steering angular velocity ω is less than the threshold value (i.e., "No" in step S34), the second input of the AND 49 is set to "0", and the process returns to step S31.

When the first input of the AND 49 is set to "1" in step S33 and the second input of the AND 49 is set to "1" in step S34, the steering angular velocity ω is large even in the release state, and it is considered that this situation is caused by a disturbance (such as a kickback). Therefore, in step S35, the AND 49 outputs (a signal indicating) occurrence of a disturbance to the data table 29. Thus, the (second) method for detecting a disturbance is completed.

EXPLANATION OF REFERENCE NUMERALS

1: Vehicle Steering Device
2: Steering Wheel
3: Steering Shaft
4: Pinion
5: Tie Rod
6: Front Wheel (Steerable Wheel)
7: Steering Control Unit
7a: First Electromotive-torque Determination Means
7b: Second Electromotive-torque Determination Means
8: Rack Shaft
9: Electric Motor
9a: Resolver (Steering-angular-velocity Sensor)
10: Manual Steering Means
11: Steering-angular-velocity Sensor
12: Torque Sensor (Steering-Torque Detection Means)
13: Connecting Shaft
15: Yaw-rate Sensor (Vehicle-behavior Detection Means)
16: Vehicle-speed Sensor (Vehicle-behavior Detection Means)
21, 26, 29: Data Tables
22, 27, 31: Limiters
23, 24, 32: Direction Extraction Means
25, 33: Upper-limit-value Setting Means
34, 35: Adding means
36: Current Control Means
37: Driver
100: Vehicle

The invention claimed is:
1. A vehicle steering device, comprising:
a manual steering means for manually steering steerable wheels in a vehicle;
a steering-torque detection means for detecting a steering torque applied to the manual steering means;

a first electromotive-torque determination means for determining a first electromotive-torque value based on the detected steering torque;
a vehicle-behavior detection means for detecting behavior of the vehicle;
a second electromotive-torque determination means for determining a second electromotive-torque value based on a detected value obtained by the vehicle-behavior detection means;
an electric motor for applying a combined electromotive torque to the steerable wheels; and
a current control means for controlling current supplied to the electric motor based on a value of the combined electromotive torque obtained by adding the first electromotive-torque value to the second electromotive-torque value,
wherein the second electromotive-torque determination means resets the second electromotive-torque value to a value equal to or less than an upper-limit value when the second electromotive-torque value is greater than the upper-limit value, and changes the upper-limit value based on a combination of a direction indicated by the second electromotive-torque value and a steering direction of the manual steering means.

2. The vehicle steering device according to claim 1, wherein the upper-limit value, which is set when the direction indicated by the second electromotive-torque value is identical to the steering direction of the manual steering means, is less than the upper-limit value which is set when the direction indicated by the second electromotive-torque value is different from the steering direction of the manual steering means.

3. The vehicle steering device according to claim 1, wherein the second electromotive-torque determination means changes the upper-limit value based on a steering speed of the manual steering means.

4. The vehicle steering device according to claim 3, wherein the upper-limit value, which is set when the direction indicated by the second electromotive-torque value is identical to the steering direction of the manual steering means, is increased when the steering speed is decreased.

5. The vehicle steering device according to claim 3, wherein the upper-limit value, which is set when the direction indicated by the second electromotive-torque value is different from the steering direction of the manual steering means, is decreased when the steering speed is decreased.

* * * * *